(12) United States Patent
Dalfra et al.

(10) Patent No.: US 11,300,975 B2
(45) Date of Patent: Apr. 12, 2022

(54) SELF-MOVING DEVICE AND WORKING SYSTEM, IDENTIFICATION METHOD, AND WORKING METHOD THEREOF

(71) Applicant: Positec Power Tools (Suzhou) Co., Ltd, Suzhou (CN)

(72) Inventors: Davide Dalfra, Villimpenta Mantua (IT); Emanuel Conti, Falciano (SM)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/875,690

(22) Filed: May 15, 2020

(65) Prior Publication Data

US 2020/0278691 A1 Sep. 3, 2020

Related U.S. Application Data

(63) Continuation of application No. PCT/CN2018/115944, filed on Nov. 16, 2018.

(30) Foreign Application Priority Data

Nov. 16, 2017 (CN) .......................... 201711138169.3

(51) Int. Cl.
*G05D 1/02* (2020.01)
*G01S 19/42* (2010.01)

(52) U.S. Cl.
CPC ............ *G05D 1/0259* (2013.01); *G01S 19/42* (2013.01); *G05D 1/0278* (2013.01)

(58) Field of Classification Search
CPC ..... G05D 1/0259–0265; G05D 1/0276; G05D 1/0278; G05D 1/0265; G01S 19/42
See application file for complete search history.

(56) References Cited

U.S. PATENT DOCUMENTS

| 5,944,132 A | 8/1999 | Davies et al. |
| 6,255,793 B1* | 7/2001 | Peless ................. A01D 34/008 180/168 |

(Continued)

FOREIGN PATENT DOCUMENTS

| CN | 101916110 A | 12/2010 |
| CN | 103197672 A | 7/2013 |

(Continued)

*Primary Examiner* — Aaron L Troost
(74) *Attorney, Agent, or Firm* — Dentons US LLP

(57) ABSTRACT

A self-moving device is provided and includes a signal detector configured to detect a boundary wire signal, a coordinate obtaining module, and a control module. The control module includes a program module and a processing module. When the signal detector does not detect the boundary wire signal, the self-moving device inputs location coordinates obtained by the coordinate obtaining module into the program module, to obtain a first determining result whether the self-moving device is within the boundary wire, and the processing module controls the self-moving device to move and work; and when the signal detector detects the boundary wire signal, the self-moving device inputs the boundary wire signal obtained by the signal detector into the program module, to obtain a second determining result whether the self-moving device is within the boundary wire, and the processing module controls the self-moving device to move and work.

20 Claims, 3 Drawing Sheets

(56) References Cited

U.S. PATENT DOCUMENTS

| | | | |
|---|---|---|---|
| 2012/0265391 A1 | 10/2012 | Letsky | |
| 2013/0110322 A1* | 5/2013 | Jagenstedt | A01D 34/008 701/2 |
| 2016/0282866 A1* | 9/2016 | Yamamura | G05D 1/0265 |
| 2017/0322562 A1* | 11/2017 | Churavy | H03M 13/156 |

FOREIGN PATENT DOCUMENTS

| | | |
|---|---|---|
| CN | 103324191 A | 9/2013 |
| CN | 106325271 A | 1/2017 |
| CN | 106485876 A | 3/2017 |

\* cited by examiner

SELF-MOVING DEVICE AND WORKING SYSTEM, IDENTIFICATION METHOD, AND WORKING METHOD THEREOF

This application is a Continuation Application of International Application No. PCT/CN2018/115944, filed on Nov. 16, 2018, which claims benefit of and priority to Chinese Patent Application No. 201711138169.3, filed on Nov. 16, 2017, all of which are hereby incorporated by reference in their entirety for all purposes as if fully set forth herein.

BACKGROUND

Technical Field

The present invention relates to a self-moving device and an automatic working system, an automatic identification method, and an automatic working method thereof.

Related Art

With the development of science and technology, intelligent self-moving devices are familiar to people. The self-moving devices may perform preset related tasks by using automatically preset programs without human operation and intervention and therefore are quite widely applied to industrial applications and household products. Self-moving gardening devices belong to one type of the self-moving devices, and are configured to perform specified tasks in gardens. The self-moving gardening devices include automatic mowers, which may automatically mow lawns. An automatic mower usually works within a boundary wire and a charging station is disposed on the boundary wire to facilitate charging. When the automatic mower is out of power when mowing a lawn, taking shelter from rain, and finishing work, or a user sends a returning command, the automatic mower may automatically return to the charging station for charging. At present, most of the automatic mowers detect a boundary wire signal to determine whether the machine is within the boundary wire. A current coverage area mainly depends on a coverage range of the boundary wire signal. When the boundary wire is longer, a resistance on the boundary wire is correspondingly larger, and the signal is also smaller. Therefore, regions far from the boundary wire cannot be covered by the signal, and consequently, the machine cannot work normally. When working on a large-area lawn, the automatic mower often fails in receiving the signal in a place far from the boundary wire, and cannot work normally. To enable the machine to receive the signal, usually, on one hand, the current of the signal is increased to enhance the intensity of the boundary wire signal; one the other hand, the signal is amplified inside the machine. However, the current of the signal has an upper limit requirement that the intensity of the signal cannot be increased unlimitedly, and if the signal is amplified inside the machine, the interference is also amplified while the signal is amplified. Therefore, it is necessary to design a new self-moving device and an identification method thereof to resolve the foregoing problem.

SUMMARY

To overcome the foregoing defect, the present invention adopts the following technical solutions:

A self-moving device is provided. The self-moving device moves in a working region defined by a boundary wire and includes:
a signal detector, configured to detect a boundary wire signal;
a coordinate obtaining module, configured to obtain location coordinates of the self-moving device; and
a control module, configured to control the self-moving device to move and work, the control module including a program module and a processing module that are preset, where
when the signal detector does not detect the boundary wire signal, the self-moving device inputs the location coordinates of the self-moving device obtained by the coordinate obtaining module into the program module, to obtain a first determining result whether the self-moving device is within the boundary wire, and the processing module controls, according to the first determining result, the self-moving device to move and work; and
when the signal detector detects the boundary wire signal, the self-moving device inputs the boundary wire signal obtained by the signal detector into the program module, to obtain a second determining result whether the self-moving device is within the boundary wire, and the processing module controls, according to the second determining result, the self-moving device to move and work.

Further, the coordinate obtaining module has a positioning precision, the boundary wire signal has a signal transmission distance, and the positioning precision is not less than the signal transmission distance of the boundary wire signal.

Further, the coordinate obtaining module includes a satellite positioning module for obtaining the location coordinates of the self-moving device by using a satellite positioning system.

Further, the coordinate obtaining module includes at least one of a global positioning module, a Beidou positioning module, a Galileo positioning module, and a Glonass positioning module.

Further, the self-moving device includes a wireless receiving module, and the wireless receiving module is configured to receive disconnection information representing that the boundary wire is in a disconnected state.

Further, the control module controls, according to the disconnection information received by the wireless receiving module, the self-moving device to stop.

Further, boundary wire signals exist around the boundary wire, to form a boundary wire signal covered region in the working region, the area of the boundary wire signal covered region is less than the area of the working region, to form a boundary wire signal uncovered region in the working region, and the control module controls, according to the disconnection information received by the wireless receiving module, the self-moving device to move and work in the boundary wire signal uncovered region.

The present invention may further adopt the following technical solutions:

An automatic working system is provided. The automatic working system includes a boundary wire and a self-moving device moving and working in a working region defined by the boundary wire, where boundary wire signals exist around the boundary wire, to form a boundary wire signal covered region in the working region, and the area of the boundary wire signal covered region is less than the area of the working region, to form a boundary wire signal uncovered region in the working region; and the self-moving device includes:

a signal detector, configured to detect a boundary wire signal;

a coordinate obtaining module, configured to obtain location coordinates of the self-moving device; and a control module, configured to control the self-moving device to move and work, the control module including a program module and a processing module that are preset, where in the boundary wire signal uncovered region, the self-moving device inputs the location coordinates of the self-moving device obtained by the coordinate obtaining module into the program module, to obtain a first determining result whether the self-moving device is within the boundary wire, and the processing module controls, according to the first determining result, the self-moving device to move and work; and in the boundary wire signal covered region, the self-moving device inputs the boundary wire signal obtained by the signal detector into the program module, to obtain a second determining result whether the self-moving device is within the boundary wire, and the processing module controls, according to the second determining result, the self-moving device to move and work.

Further, the coordinate obtaining module has a positioning precision, and the positioning precision is not less than a minimum distance between the boundary wire and the boundary wire signal uncovered region.

Further, the coordinate obtaining module includes a satellite positioning module for obtaining the location coordinates of the self-moving device by using a satellite positioning system.

Further, the automatic working system further includes a disconnection detection module, the disconnection detection module is configured to detect whether the boundary wire is disconnected to obtain a detection result, and the control module controls, according to the detection result of the disconnection detection module, the self-moving device to move and work.

Further, if the disconnection detection module detects that the boundary wire is disconnected, the control module controls the self-moving device to stop.

Further, if the disconnection detection module detects that the boundary wire is disconnected, the control module controls the self-moving device to move and work in the boundary wire signal uncovered region.

Further, the disconnection detection module and the self-moving device are respectively provided with a wireless transmission module and a wireless receiving module capable of wirelessly communicating with each other, and if the disconnection detection module detects that the boundary wire is in a disconnected state, the wireless transmission module sends disconnection information representing that the boundary wire is in a disconnected state to the wireless receiving module.

Further, the boundary wire signal has a signal transmission range, and a range of the working region defined by the boundary wire is larger than the signal transmission range of the boundary wire signal.

The present invention may further adopt the following technical solutions:

A method for automatically identifying whether a self-moving device is within a boundary wire is provided, where the method includes the following steps:

step 1: providing a self-moving device moving in a working region defined by a boundary wire, where boundary wire signals exist around the boundary wire, the self-moving device includes a signal detector configured to detect a boundary wire signal, a coordinate positioning module configured to obtain location coordinates of the self-moving device, and a control module configured to control the self-moving device to move and work, and the control module includes a program module that is preset;

step 2: detecting, by the signal detector, the boundary wire signal to obtain a detection result whether the boundary wire signal is detected;

step 3): selecting, according to the detection result, a method for determining whether the self-moving device is within the boundary wire, which is specifically that: if the detection result is that the boundary wire signal cannot be detected, perform step 4; and if the detection result is that the boundary wire signal can be detected, perform step 5;

step 4): inputting the location coordinates of the self-moving device obtained by the coordinate obtaining module into the program module, to obtain whether the self-moving device is within the boundary wire; and step 5: inputting the boundary wire signal obtained by the signal detector into the program module, to obtain whether the self-moving device is within the boundary wire.

Further, in step 1, the self-moving device moves around the boundary wire by one circle to record location coordinates of the boundary wire.

Further, the coordinate obtaining module has a positioning precision, the boundary wire signal has a signal transmission distance, and the positioning precision is not less than the signal transmission distance of the boundary wire signal.

Further, in step 1, the coordinate obtaining module includes a satellite positioning module for obtaining the location coordinates of the self-moving device by using a satellite positioning system.

Further, in step 1, boundary wire signals exist around the boundary wire, to form a boundary wire signal covered region in the working region, and the area of the boundary wire signal covered region is less than the area of the working region, to form a boundary wire signal uncovered region in the working region;

The present invention may further adopt the following technical solutions:

An automatic working method of a self-moving device, where the automatic working method includes the foregoing automatic identification method.

Further, the automatic working method further includes the following steps:

step 6: providing a disconnection detection module, where the disconnection detection module is configured to detect whether the boundary wire is disconnected, if it is detected that the boundary wire is disconnected, perform step 7, and if it is not detected that the boundary wire is disconnected, continue step 6; and step 7: controlling, by the control module, the self-moving device to stop.

Further, in step 6, the disconnection detection module and the self-moving device are respectively provided with a wireless transmission module and a wireless receiving module, and if the disconnection detection module detects that the boundary wire is in a disconnected state, the wireless transmission module sends disconnection information representing that the boundary wire is in a disconnected state to the wireless receiving module.

Further, the automatic working method further includes the following steps:

step 6: providing a disconnection detection module, where the disconnection detection module is configured to detect whether the boundary wire is disconnected, if it is detected that the boundary wire is disconnected, perform step 7, and if it is not detected that the boundary wire is disconnected, continue step 6; and step 7: controlling, by the control module, the self-moving device to work in the boundary wire signal uncovered region.

Further, in step 6, the disconnection detection module and the self-moving device are respectively provided with a wireless transmission module and a wireless receiving module, and if the disconnection detection module detects that the boundary wire is in a disconnected state, the wireless transmission module sends disconnection information representing that the boundary wire is in a disconnected state to the wireless receiving module.

The beneficial effect of the present invention is that the working region of the self-moving device is controlled in a manner of combining a boundary system and a coordinate positioning system, to implement precise positioning of the self-moving device in a large-area working region.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
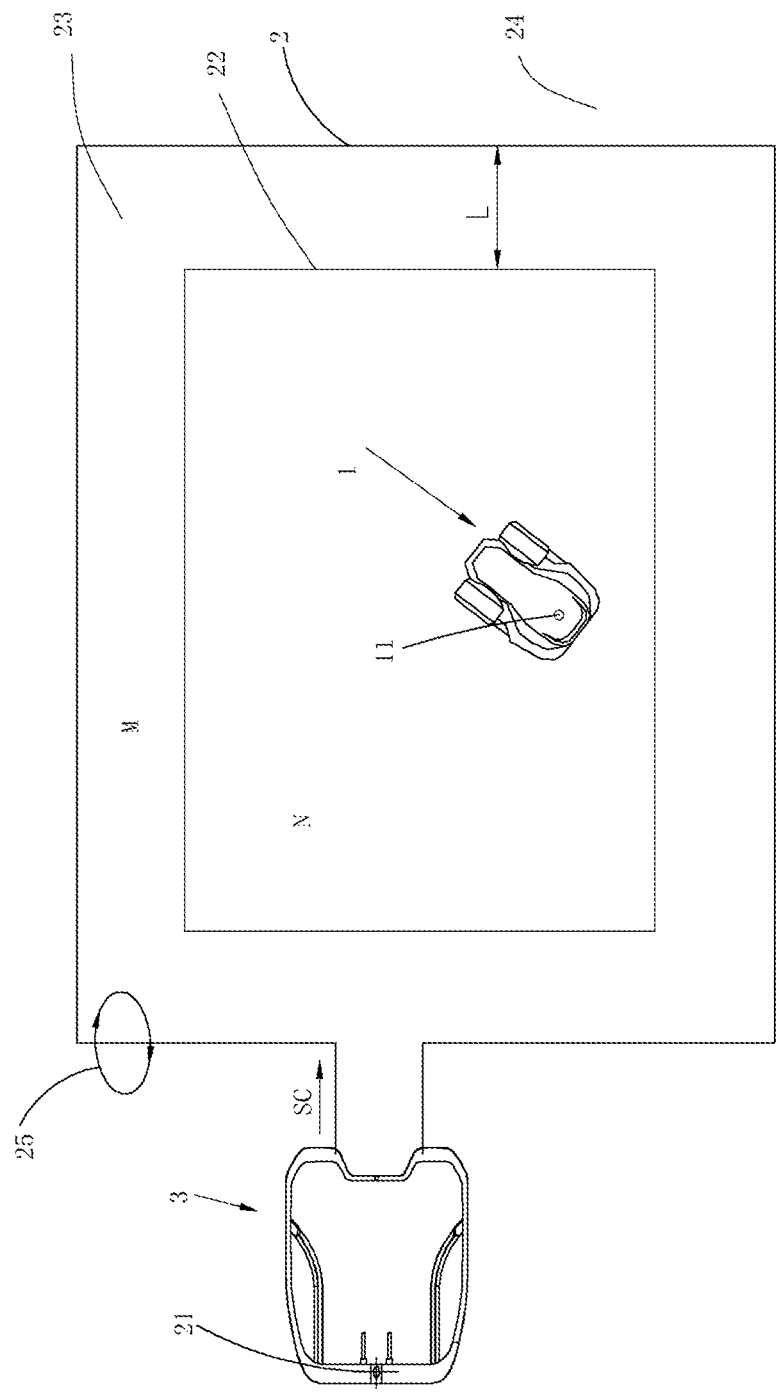
FIG. 1 is a schematic diagram of an automatic working system in an embodiment of the present invention.
Figure 2:
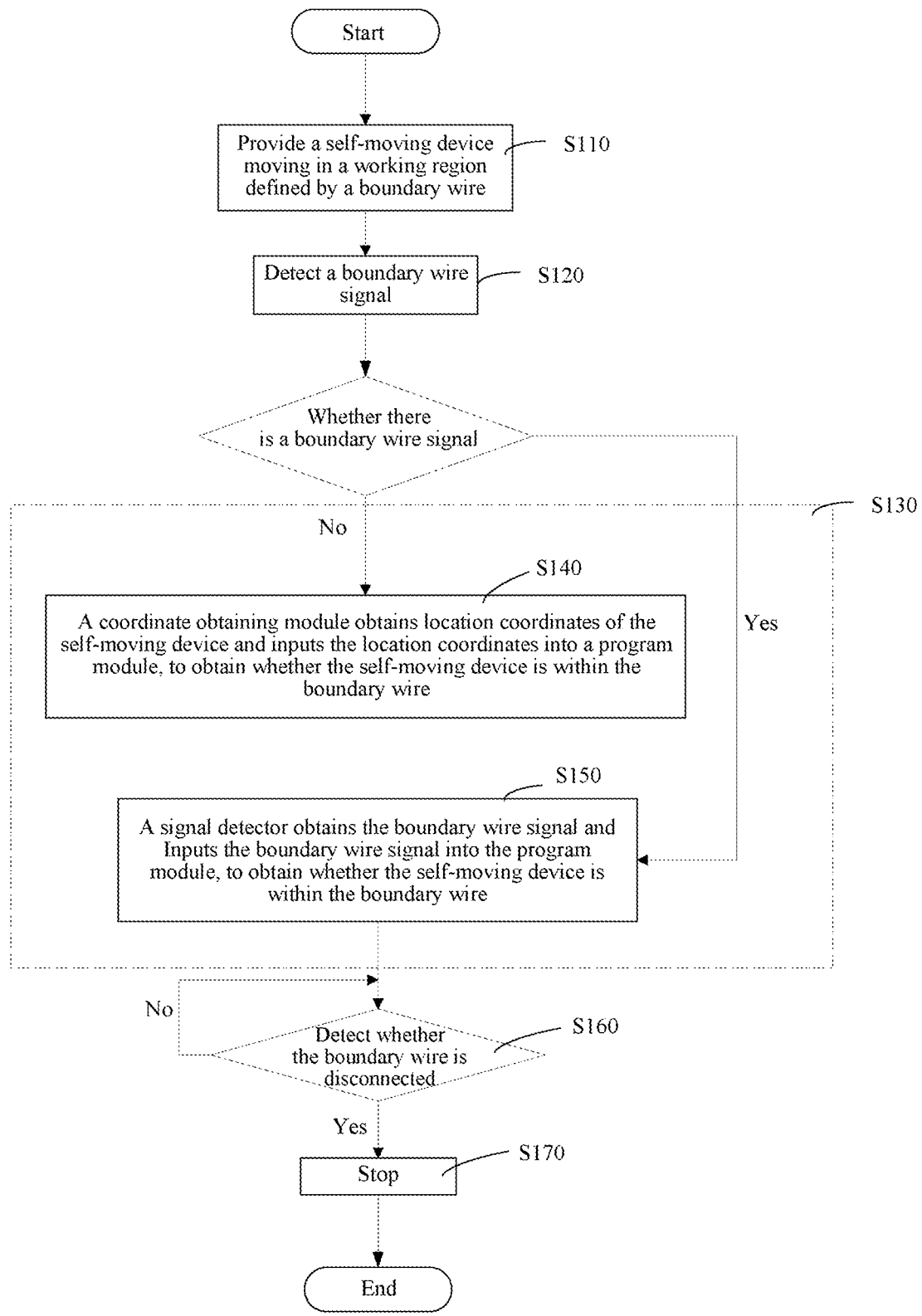
FIG. 2 is a flowchart of an automatic working method of a self-moving device in an embodiment of the present invention.

An embodiment of the present invention provides an automatic working system. Referring to FIG. 1, in this embodiment, the automatic working system includes a self-moving device 1, a stop station 3, and a boundary wire 2. In this embodiment, the self-moving device 1 is an automatic mower. In other embodiments, the self-moving device may alternatively be an automatic leaf sweeping machine, an automatic sprinkler, a multi-function machine, or the like. The self-moving device is configured to walk in a preset working region and perform mowing work. The boundary wire encloses a closed or basically closed polygon, to define the working region of the self-moving device. The stop station 3 is located on the boundary wire of the working region, and is configured to provide energy to the self-moving device or for the self-moving device to stop. In this specific embodiment, the stop station 3 is a charging station for the automatic mower to return to replenish energy in lack of power or for the self-moving device to stop, and for generating and transmitting a border signal. It may be understood that, in some other embodiments, the stop station 3 may alternatively be another external device capable of communicating with the automatic mower, which is not limited herein.

In this embodiment, the self-moving device 1 moves and works in the working region 23 defined by the boundary wire 2. The self-moving device 1 usually has a working mode and a returning mode. In the working mode, the self-moving device 1 moves in the preset working region and performs a preset related task. In the returning mode, the self-moving device can automatically move to the charging station according to a preset route, to charge or stop. To limit the self-moving device 1 to work in the preset working region in the working mode, in this embodiment, the working region of the self-moving device 1 is controlled in a manner of combining a boundary system and a coordinate positioning system. Meanwhile, in this embodiment, the self-moving device 1 in the returning mode quickly returns in the manner of combining the boundary system and the coordinate positioning system.

In this embodiment, boundary wire signals exist around the boundary wire 2, and the self-moving device 1 includes a signal detector 11 configured to detect the boundary wire signal, a coordinate obtaining module configured to obtain location coordinates of the self-moving device 1, and a control module configured to control the self-moving device 1 to move and work. The coordinate obtaining module includes a satellite positioning module for obtaining the location coordinates of the self-moving device by using a satellite positioning system, such as a global positioning module (GPS positioning module) for obtaining the location coordinates of the self-moving device 1 by using a global positioning system (GPS), a Beidou positioning module for obtaining the location coordinates of the self-moving device 1 by using a Beidou positioning system, a Galileo positioning module for obtaining the location coordinates of the self-moving device 1 by using a Galileo positioning system, or a Glonass positioning module for obtaining the location coordinates of the self-moving device 1 by using a Glonass positioning system. Certainly, the coordinate obtaining module may alternatively be another positioning module, such as an ultra-wideband positioning module for obtaining the location coordinates by using an ultra-wideband positioning system, or an ultrasonic positioning module for obtaining the location coordinates by using an ultrasonic positioning system. As shown in FIG. 1, in the working region 23, signal coverage of the boundary wire signal has a certain range, the boundary wire signal be can received within the range that can be covered by the boundary wire signal, and the boundary wire signal cannot be received beyond the coverage range of the boundary wire signal. Therefore, the working region 23 includes a boundary wire signal covered region M and a boundary wire signal uncovered region N. In this embodiment, boundary wire signals exist around the boundary wire, to form a boundary wire signal covered region M in the working region, and the area of the boundary wire signal covered region M is less than the area of the working region 23, to form a boundary wire signal uncovered region N in the working region 23. The boundary wire signal covered region M is the range that can be covered by the boundary wire signal, that is, the signal detector 11 of the self-moving device 1 may receive the boundary wire signal in the boundary wire signal covered region M; and the boundary wire signal uncovered region N refers to a region that is in the working region 23 and that cannot be covered by the boundary wire signal, that is, the signal detector 11 of the self-moving device 1 cannot receive the boundary wire signal in the boundary wire signal uncovered region N. When the self-moving device 1 moves to the boundary wire signal uncovered region N, the signal detector 11 of the self-moving device 1 cannot detect the boundary wire signal, and the self-moving device 1 cannot determine whether the self-moving device 1 is within the boundary wire and cannot work normally. To enable the self-moving device 1 to work normally in the working region 23, the area of the boundary wire signal covered region M is usually designed to be less than that of the working region 23 in the industry, that is, the entire working region 23 may be covered by the boundary wire signal, and the self-moving device 1 may receive the boundary wire signal in the range of the entire working region 23. Generally, a current value of a border signal is 3.6 A. When the area of a lawn is larger, the boundary wire is longer, a resistance on the boundary wire is correspondingly larger, and the signal is smaller. When the area of the lawn is larger than 2000 $m^2$, the boundary wire signal cannot cover the central region of the lawn, and consequently, the self-moving device 1 cannot work normally in the center of the lawn. In this case, to enable the center of the lawn to be covered by the boundary wire signal, on one hand, the current of the signal is increased to enhance the intensity of the boundary wire signal; on the other hand, the signal is amplified inside the self-moving device, to increase the boundary wire signal covered region M. However, the signal of the current has an upper limit requirement, the intensity of the signal cannot be increased unlimitedly, and if the signal is amplified inside the self-moving device 1, and the interference is also amplified while the signal is amplified. Therefore, when the self-moving device 1 encounters a larger-area lawn, for example, a lawn larger than 5000 $m^2$, that is, when the area of the working region 23 is larger than 5000 $m^2$, it is difficult to continue to increase the current of the signal to enhance the intensity of the boundary wire signal and amplify the signal inside the self-moving device 1, to receive the boundary wire signal in the entire working region 23. In this case, the self-moving device 1 cannot work normally in a region that is in the lawn and that is not covered by the boundary wire signal.

In a specific embodiment, as shown in FIG. 1, the area of the working region 23 is larger than the area of the boundary wire signal covered region M, and the region beyond the boundary wire signal covered region M in the working region 23 is referred to as a boundary wire signal uncovered region N. The boundary wire signal uncovered region N is the region in which the boundary wire signal cannot be received in the working region 23. In this embodiment, to enable the self-moving device 1 to work normally in the entire working region 23, in this embodiment, the boundary system is used, that is, the boundary wire signal is detected, in the boundary wire signal covered region M to determine whether the self-moving device 1 is within the boundary wire. The coordinate positioning system, that is, the method for positioning the location coordinates of the self-moving device 1, is used in the boundary wire signal uncovered region N to determine whether the self-moving device 1 is within the boundary wire. Specifically, when the signal detector 11 does not detect the boundary wire signal, the self-moving device 1 inputs the location coordinates of the self-moving device 1 obtained by the coordinate obtaining module into the program module, to obtain a first determining result whether the self-moving device 1 is within the boundary wire 2, and the processing module controls, according to the first determining result, the self-moving device 1 to move and work; and when the signal detector 11 detects the boundary wire signal, the self-moving device 1 inputs the boundary wire signal obtained by the signal detector 11 into the program module, to obtain a second determining result whether the self-moving device 1 is within the boundary wire, and the processing module controls, according to the second determining result, the self-moving device to move and work.

In a specific embodiment, a coordinate positioning module has a positioning precision X. For example, the positioning precision is within 10 m, that is, an error value between the location coordinates of the self-moving device 1 obtained by the coordinate obtaining module and the actual location of the self-moving device 1 is within 10 m. A minimum distance between the boundary wire 2 and a boundary 22 of the boundary wire signal covered region M and the boundary wire signal uncovered region N is L, that is, the minimum distance between the boundary wire 2 and the uncovered region N is L, and the positioning precision X of the coordinate positioning module is not less than the minimum distance L between the boundary wire 2 and the uncovered region N, to ensure that when the self-moving device 1 positions the location coordinates of the self-moving device 1 in the boundary wire signal uncovered region N, to determine whether the self-moving device is within the boundary wire, the positioning precision of the coordinate positioning module does not cause false determining of the self-moving device 1, and a situation in which the location coordinates positioned by the coordinate positioning module are within the boundary wire, but the self-moving device 1 moves beyond the boundary wire is avoided. The boundary wire signal has a signal transmission distance, the minimum distance L between the boundary wire 2 and the boundary 22 of the boundary wire signal covered region M and the boundary wire signal uncovered region N may also be referred to as a boundary wire signal transmission distance, and the positioning precision is not less than the boundary wire signal transmission distance, to ensure that when the self-moving device 1 positions the location coordinates of the self-moving device 1 in the boundary wire signal uncovered region N, to determine whether the self-moving device is within the boundary wire, the positioning precision of the coordinate positioning module does not cause false determining of the self-moving device 1, and a situation in which the location coordinates positioned by the coordinate positioning module are within the boundary wire, but the self-moving device 1 moves beyond the boundary wire is avoided. A larger value X of the positioning precision X indicates a lower positioning precision, and a smaller value X indicates a higher positioning precision. For example, the positioning precision being 5 m means that the error value between the location coordinates of the self-moving device 1 obtained by the coordinate obtaining module and the actual location of the self-moving device 1 is within 10 m, and the positioning precision of the positioning precision 5 m is higher than the positioning precision of the positioning precision 10 m.

In a specific embodiment, in the boundary wire signal uncovered region N, that is, when the signal detector 11 does not detect the boundary wire signal, the self-moving device 1 may adopt the following method to determine whether the self-moving device is within the boundary wire by using a coordinate positioning system. As shown in FIG. 1, when used for the first time, the self-moving device 1 moves around the boundary wire 2 by one circle, records location coordinates of the boundary wire 2, and stores the location coordinates of the boundary wire 2. When the signal detector 11 does not detect the boundary wire signal, the self-moving device 1 positions current location coordinates of the self-moving device 1 by using a coordinate positioning module, and inputs the current location coordinates into the program module to obtain a first determining result whether the self-moving device 1 is within the boundary wire. Specifically, the program module may compare the current location coordinates with the stored location coordinates of the boundary wire 2, and determine whether the current location coordinates of the self-moving device 1 are within the location coordinates of the boundary wire 2, to determine whether the self-moving device 1 is within the boundary wire 2. Certainly, specifically, the program module may also adopt other operational methods to obtain the first determining result whether the self-moving device 1 is within the boundary wire.

In a specific embodiment, in the boundary wire signal covered region M, that is, when the signal detector 11 detects the boundary wire signal, the self-moving device 1 may adopt the following method to determine whether the self-moving device 1 is within the boundary wire by using a boundary system. As shown in FIG. 1, the boundary system includes a signal generator 21, a self-moving device 1, and a boundary wire 2. The boundary wire 2 marks a working region 23 enclosed by the boundary wire 2 and a non-working region 24 beyond the boundary wire 2. The signal generator 21 is electrically connected to the boundary wire 2, the signal generator 21 generates a preset border signal SC and sends the signal to the boundary wire 2, and the preset border signal SC generates a varying magnetic field 25 when flowing through the boundary wire 2. The signal detector 11 detects the varying magnetic field 25, and generates a detection signal SC'. The preset border signal SC is a time-varying electric signal. For example, the preset border signal SC' may be a periodic pulse current signal, and the preset border signal SC' generates a varying magnetic field 25 around the boundary wire 2 when flowing through the boundary wire 2. At any moment, the magnetic field 25 respectively presents opposite polarities at two sides of the boundary wire 2, that is, the polarity of the magnetic field in the working region 23 is opposite to the polarity of the magnetic field in the non-working region 24. When the signal detector 11 detects the varying magnetic field 25, and generates the detection signal SC', the self-moving device inputs the detection signal SC' into the program module, to obtain a second determining result whether the boundary wire is within the boundary wire, and the processing module controls, according to the second determining result, the self-moving device 1 to move and work. In this embodiment, the signal detector 11 may have a plurality of forms as long as the signal detector 11 can convert the magnetic field 25 into a corresponding electric signal. In an embodiment, the signal detector 11 includes an inductor. The signal detector 11 induces the magnetic field 25 and generates a corresponding electromotive force, thereby converting the magnetic field 25 into the detection signal SC' and delivering the signal to the control module. The polarity of the magnetic field 25 in the working region 23 is opposite to that in the non-working region 24, and correspondingly, the polarity of the detection signal SC' in the working region 23 is also opposite to that in the non-working region 24. When the signal detector 11 detects the boundary wire signal, the control module determines, according to the polarity of the detection signal SC', whether the self-moving device 1 is within the boundary wire 2. When the polarity of the detection signal SC' changes, the control module determines that the self-moving device 1 is crossing the boundary wire 2. The control module controls the self-moving device 1 to back or turn, so that the detection signal SC' changes to the initial polarity, thereby ensuring that the self-moving device 1 always works in the working region 23. In this embodiment, the electric signal is converted into the varying magnetic field to be used as the boundary wire signal. In other embodiments, the boundary wire signal may alternatively be generated in other manners, and the boundary wire signal may alternatively be signals of other forms, for example, a modulation signal having a feature frequency and a carrier signal having a carrier frequency.

In a specific embodiment, the automatic working system further includes a disconnection detection module configured to detect whether the boundary wire is disconnected, and the boundary wire being disconnected means that no boundary wire signals are generated around the boundary wire 2. The control module controls, according to a detection result of the disconnection detection module, the self-moving device to move and work. Specifically, in an embodiment, when the disconnection detection module detects that the boundary wire is disconnected, the control module controls the self-moving device to stop. In another embodiment, when the disconnection detection module detects that the boundary wire is disconnected, the control module controls the self-moving device to work in the boundary wire signal uncovered region. Specifically, the disconnection detection module and the self-moving device 1 may be connected in wireless communication manners, such as WiFi and Bluetooth. Specifically, the self-moving device 1 further includes a wireless receiving module, and the wireless receiving module is configured to receive disconnection information representing that the boundary wire is in a disconnected state. Specifically, in an embodiment, the control module controls, according to the disconnection information received by the wireless receiving module, the self-moving device 1 to stop. In another embodiment, the control module controls, according to the disconnection information received by the wireless receiving module, the self-moving device to work in the boundary wire signal uncovered region. In a specific embodiment, the charging station 3 is provided with a disconnection detection module for detecting whether the boundary wire is disconnected and a wireless transmission module. When the disconnection detection module detects that the boundary wire is disconnected, the wireless receiving module that is disposed on the self-moving device 1 and that is capable of wirelessly communicating with the wireless transmission module enables the self-moving device 1 to wirelessly communicate with the charging station 3. The charging station 3 sends the disconnection information detected by the disconnection detection module to the self-moving device 1 by using the wireless transmission module. When the self-moving device 1 receives the disconnection information, the control module controls the self-moving device 1 to stop or work in the boundary wire signal uncovered region. In other embodiments, the disconnection detection module may alternatively be disposed at a location beyond the charging station 3, for example, disposed on the signal generator 21 or the boundary wire 2 or disposed independently of other devices. In other embodiments, whether the boundary wire is in a disconnected state may also be directly determined by the signal generator 21. Specifically, the signal generator 21 includes a power supply and a controllable switch, and the signal generator 21 and the boundary wire 2 are connected to form a circuit loop. By controlling off and on of the controllable switch, whether the boundary wire 2 is disconnected may be controlled. When the controllable switch controls the boundary wire to be disconnected, the signal generator 21 sends the disconnection information to the self-moving device 1 in a wireless communication manner. In this embodiment, the signal generator 21 may also be seen as a disconnection detection module.

An embodiment of the present invention further provides a method for automatically identifying whether a self-moving device is within a boundary wire. As shown in FIG.

2, the method for automatically identifying whether a self-moving device is within a boundary wire includes step S110 to step S150. Details are as follows:

Step S110: Provide a self-moving device 1 moving in a working region defined by a boundary wire 2, where boundary wire signals exist around the boundary wire 2, the self-moving device 1 includes a signal detector 11 configured to detect a boundary wire signal, a coordinate positioning module configured to obtain location coordinates of the self-moving device 1, and a control module configured to control the self-moving device 1 to move and work, and the control module includes a program module that is preset; A coordinate obtaining module may be a satellite positioning module, such as a GPS positioning module, a Beidou positioning module, a Galileo positioning module, or Glonass positioning module. Certainly, the coordinate obtaining module may alternatively be another type of positioning modules, such as an ultra-wideband positioning module or an ultrasonic positioning module. In a specific embodiment, as shown in FIG. 1, the area of the working region 23 is larger than the area of a boundary wire signal covered region M. In this embodiment, the boundary wire signal has a signal transmission range, and the transmission range of the boundary wire signal is a range in which the boundary wire signal covered region M is located. In this embodiment, the range of the working region defined by the boundary wire is larger than the transmission range of the boundary wire signal. The coordinate positioning module has a positioning precision X. For example, the positioning precision is within 10 m, that is, an error value between the location coordinates of the self-moving device 1 obtained by the coordinate obtaining module and the actual location of the self-moving device 1 is within 10 m. A minimum distance between the boundary wire 2 and the uncovered region N is L, that is, the minimum distance between the boundary wire 2 and a boundary 22 of the boundary wire signal covered region M and the boundary wire signal uncovered region N is L, and the positioning precision X of the coordinate positioning module is not less than the minimum distance L between the boundary wire 2 and the boundary 22 of the boundary wire signal covered region M and the boundary wire signal uncovered region N, to ensure that when the self-moving device 1 positions the location coordinates of the self-moving device 1 in the boundary wire signal uncovered region N, to determine whether the self-moving device is within the boundary wire, the positioning precision of the coordinate positioning module does not cause false determining of the self-moving device 1, and a situation in which the location coordinates positioned by the coordinate positioning module are within the boundary wire, but the self-moving device 1 moves beyond the boundary wire is avoided. The distance between the boundary wire 2 and the uncovered region N may also be referred to as a boundary wire signal transmission distance.

Step S120: The signal detector 11 detects the boundary wire signal to obtain a detection result whether the boundary wire signal is detected.

Step S130: Select, according to the detection result, a method for determining whether the self-moving device is within the boundary wire, which is specifically that: if the detection result is that the boundary wire signal cannot be detected, perform step 140; and if the detection result is that the boundary wire signal can be detected, perform step 150.

Step 140: Input the location coordinates of the self-moving device obtained by the coordinate obtaining module into the program module, to obtain whether the self-moving device is within the boundary wire. In a specific embodiment, when the signal detector 11 does not detect the boundary wire signal, the self-moving device 1 may adopt the following method to determine whether the self-moving device is within the boundary wire by using a coordinate positioning system. As shown in FIG. 1, when used for the first time, the self-moving device 1 moves around the boundary wire 2 by one circle, to record location coordinates of the boundary wire 2, and stores the location coordinates of the boundary wire 2. When the signal detector 11 does not detect the boundary wire signal, the self-moving device 1 positions current location coordinates of the self-moving device 1 by using a coordinate positioning module, and inputs the current location coordinates into the program module to obtain a first determining result whether the self-moving device 1 is within the boundary wire. Specifically, the program module may compare the current location coordinates with the stored location coordinates of the boundary wire 2, and determine whether the current location coordinates of the self-moving device 1 are within the location coordinates of the boundary wire 2, to determine whether the self-moving device 1 is within the boundary wire 2. Certainly, specifically, the program module may also adopt other operational methods to obtain the first determining result whether the self-moving device 1 is within the boundary wire.

Step 150: Input the boundary wire signal obtained by signal detector into the program module, to obtain whether the self-moving device is within the boundary wire. In a specific embodiment, when the signal detector 11 detects the boundary wire signal, the self-moving device 1 may adopt the following method to determine whether the self-moving device 1 is within the boundary wire by using a boundary system. As shown in FIG. 1, the boundary system includes a signal generator 21, a self-moving device 1, and a boundary wire 2. The boundary wire 2 marks a working region 23 enclosed by the boundary wire 2 and a non-working region 24 beyond the boundary wire 2. The signal generator 21 is electrically connected to the boundary wire 2, the signal generator 21 generates a preset border signal SC and sends the signal to the boundary wire 2, and the preset border signal SC generates a varying magnetic field 25 when flowing through the boundary wire 2. The signal detector 11 detects the varying magnetic field 25, and generates a detection signal SC'. The preset border signal SC is a time-varying electric signal. For example, the preset border signal SC' may be a periodic pulse current signal, and the preset border signal SC' generates a varying magnetic field 25 around the boundary wire 2 when flowing through the boundary wire 2. At any moment, the magnetic field 25 respectively presents opposite polarities at two sides of the boundary wire 2, that is, the polarity of the magnetic field in the working region 23 is opposite to the polarity of the magnetic field in the non-working region 24. When the signal detector 11 detects the varying magnetic field 25, and generates the detection signal SC', the self-moving device inputs the detection signal SC' into the program module, to obtain a second determining result whether the boundary wire is within the boundary wire, and the processing module controls, according to the second determining result, the self-moving device 1 to move and work. In this embodiment, the signal detector 11 may have a plurality of forms as long as the signal detector 11 can convert the magnetic field 25 into a corresponding electric signal. In an embodiment, the signal detector 11 includes an inductor. The signal detector 11 induces the magnetic field 25 and generates a corresponding electromotive force, thereby converting the magnetic field 25 into the detection signal SC' and delivering the signal to the control module. The polarity of the magnetic field 25 in the working region 23 is opposite to that in the non-working region 24, and correspondingly, the state of the detection signal SC' in the working region 23 is also opposite to that in the non-working region 24. When the signal detector 11 detects the boundary wire signal, the control module determines, according to the detection signal SC', whether the self-moving device 1 is within the boundary wire 2. When the state of the detection signal SC' changes, the control module determines that the self-moving device 1 is crossing the boundary wire 2. The control module controls the self-moving device 1 to back or turn, so that the detection signal SC' changes to the initial state, thereby ensuring that the self-moving device 1 always works in the working region 23. In this embodiment, the electric signal is converted into the varying magnetic field to be used as the boundary wire signal. In other embodiments, the boundary wire signal may alternatively be generated in other manners, and the boundary wire signal may alternatively be signals of other forms, for example, a modulation signal having a feature frequency and a carrier signal having a carrier frequency.

An embodiment of the present invention further includes an automatic working method of a self-moving device. The automatic work method includes the foregoing method for automatically identifying whether a self-moving device is within a boundary wire. In a specific embodiment, the automatic working method further includes the following steps S160 to S170. Details are as follows:

Step S160: Provide a disconnection detection module, where the disconnection detection module is configured to detect whether the boundary wire is disconnected, if it is detected that the boundary wire is disconnected, perform step S170, and if it is not detected that the boundary wire is disconnected, continue step S160. In a specific embodiment, the charging station 3 is provided with a disconnection detection module for detecting whether the boundary wire is disconnected and a wireless transmission module. When the disconnection detection module detects that the boundary wire is disconnected, the wireless receiving module that is disposed on the self-moving device 1 and that is capable of wirelessly communicating with the wireless transmission module enables the self-moving device 1 to wirelessly communicate with the charging station 3. The charging station 3 sends the disconnection information detected by the disconnection detection module to the self-moving device 1 by using the wireless transmission module. In other embodiments, the disconnection detection module may alternatively be disposed at a location beyond the charging station 3, for example, disposed on the signal generator 21 or the boundary wire 2 or disposed independently of other devices. In other embodiments, whether the boundary wire is in a disconnected state may also be directly determined by the signal generator 21. Specifically, the signal generator 21 includes a power supply and a controllable switch, and the signal generator 21 and the boundary wire 2 are connected to form a circuit loop. By controlling off and on of the controllable switch, whether the boundary wire 2 is disconnected may be controlled. When the controllable switch controls the boundary wire to be disconnected, the signal generator 21 sends the disconnection information to the self-moving device 1 in a wireless communication manner. In this embodiment, the signal generator 21 may also be seen as a disconnection detection module.

Step S170: The control module controls the self-moving device to stop.

Figure 3:
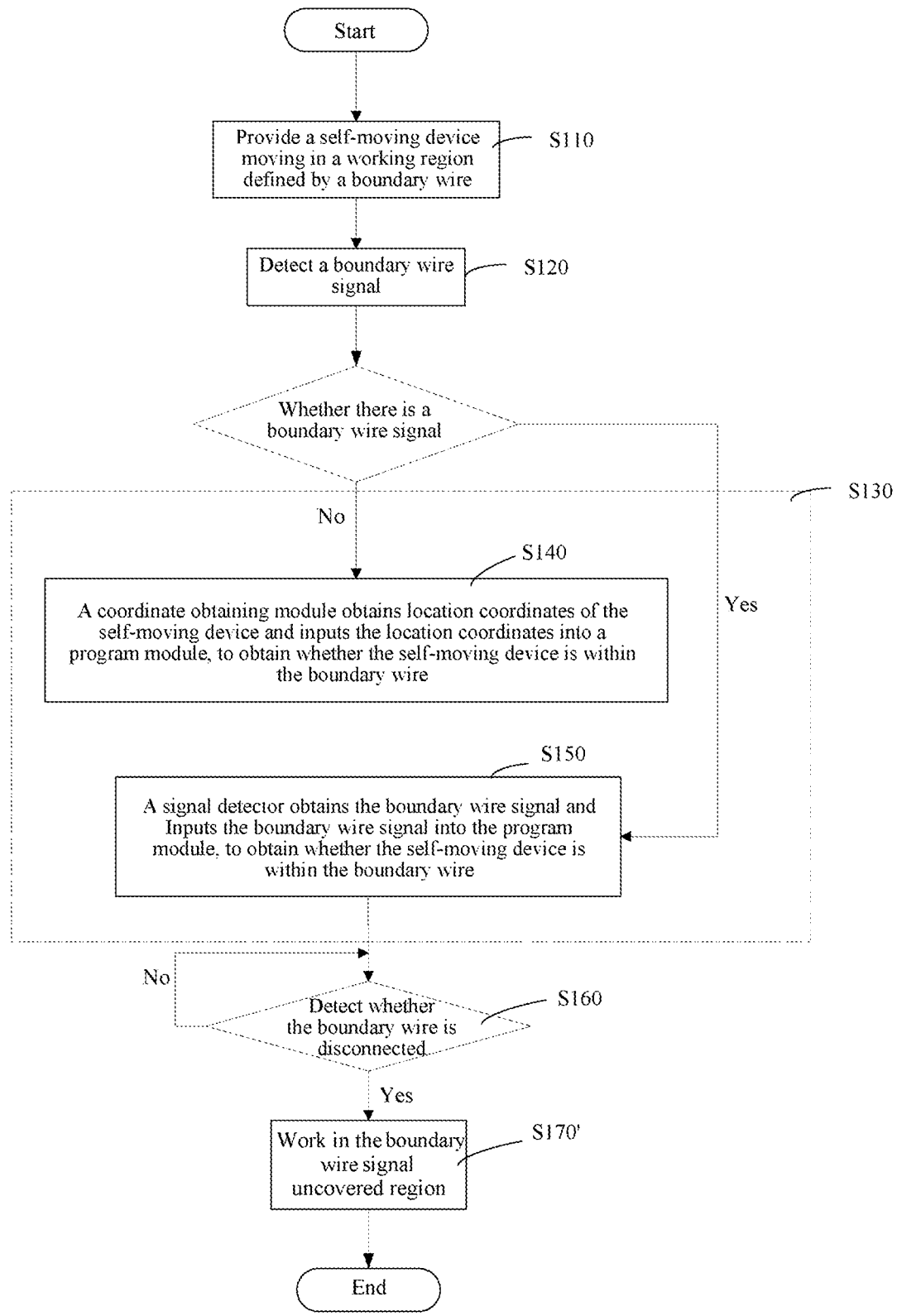
FIG. 3 is a flowchart of an automatic working method of a self-moving device in an embodiment of the present invention.

In another specific embodiment, as shown in FIG. 3, step S170 is replaced with step S170': The control module controls the self-moving device to work in the boundary wire signal uncovered region.

Specifically, the disconnection detection module and the self-moving device are respectively provided with a wireless transmission module and a wireless receiving module. The wireless transmission module sends disconnection information representing that the boundary wire is in a disconnected state to the wireless receiving module, and when the disconnection detection module detects that the boundary wire is disconnected, the wireless transmission module sends the disconnection information to the wireless receiving module. The control module controls, according to the disconnection information received by the wireless receiving module, the self-moving device to stop.

In this embodiment, the working region of the self-moving device 1 is controlled in the manner of combining the boundary system and the coordinate positioning system, to implement more precise positioning. Particularly, in a large-area working region, precise positioning can be implemented by using only ordinary intensity of the boundary wire signal and an ordinary positioning precision, to achieve an optimal positioning effect at the lowest cost. The self-moving device 1 is made to walk around the boundary wire 2 by one circle before use to automatically record the location coordinates of the boundary wire 2, so that the trouble of additionally storing the location coordinates of the boundary wire is saved, and the operation is simple. The self-moving device 1 quickly returns in the returning mode in the manner of combining the boundary system and the coordinate positioning system, and when a positioning signal of the coordinate positioning module, such as a GPS signal, is poor, the self-moving device 1 may still quickly return by using the boundary wire. Meanwhile, the coordinate positioning system is added to also implement an anti-theft function by positioning the location coordinates of the self-moving device 1. For example, when the self-moving device 1 is stolen, the self-moving device 1 can be found by positioning the location coordinates thereof.

The present invention is not limited to the specific embodiments, and the structure and the method based on the idea of the present invention fall within the protection scope of the present invention.

What is claimed is:

1. An automatic working system, comprising:
   a self-moving device; and
   a boundary wire configured to transmit a boundary wire signal,
   wherein the self-moving device moves in a working region defined by the boundary wire, and
   wherein:
   when the self-moving device does not detect the boundary wire signal, the self-moving device:
   obtains location coordinates of the self-moving device,
   inputs said coordinates into a program module to obtain a first determining result whether the self-moving device is within the boundary wire, and
   controls, according to the first determining result, the self-moving device to move and work; and
   when self-moving device detects the boundary wire signal, the self-moving device:
   inputs the boundary wire signal into the program module to obtain a second determining result whether the self-moving device is within the boundary wire, and controls, according to the second determining result, the self-moving device to move and work.

2. The automatic working system of claim 1, wherein the location coordinates have a positioning precision, the boundary wire signal has a signal transmission distance, and the positioning precision is not less than the signal transmission distance of the boundary wire signal.

3. The automatic working system of claim 1, wherein the location coordinates of the self-moving device are obtain via satellite positioning using a satellite positioning system.

4. The automatic working system of claim 3, wherein the satellite positioning system comprises at least one of a global positioning module, a Beidou positioning module, a Galileo positioning module, and a Glonass positioning module.

5. The automatic working system of claim 1, wherein the self-moving device is configured to receive disconnection information representing that the boundary wire is in a disconnected state.

6. The automatic working system of claim 5, wherein according to the disconnection information received by the self-moving device, the self-moving device is configured to stop.

7. The automatic working system of claim 5, wherein boundary wire signals exist around the boundary wire, to form a boundary wire signal covered region in the working region, the area of the boundary wire signal covered region is less than the area of the working region, to form a boundary wire signal uncovered region in the working region, and the self-moving device, according to the disconnection information received, the self-moving device is configured to move and work in the boundary wire signal uncovered region.

8. An automatic working system, comprising:
a boundary wire configured to transmit a boundary wire signal; and
a self-moving device,
wherein:
in a region not covered by the boundary wire signal where the self-moving device does not detect the boundary wire signal, the self-moving device:
obtains location coordinates of the self-moving device,
inputs said coordinates into a program module to obtain a first determining result whether the self-moving device is within the boundary wire, and
controls, according to the first determining result, the self-moving device to move and work; and
in a region covered by the boundary wire signal where the self-moving device detects the boundary wire signal, the self-moving device:
inputs the boundary wire signal into the program module to obtain a second determining result whether the self-moving device is within the boundary wire, and
controls, according to the second determining result, the self-moving device to move and work.

9. The automatic working system of claim 8, further comprising:
a charging station configured to detect whether the boundary wire is disconnected to obtain a detection result, wherein the self-moving device controls, according to the detection result, the self-moving device to move and work.

10. The automatic working system of claim 9, wherein if the charging station detects that the boundary wire is disconnected, the self-moving device stops.

11. The automatic working system of claim 9, wherein if the charging station detects that the boundary wire is disconnected, the self-moving device moves and works in the boundary wire signal uncovered region.

12. The automatic working system of claim 9, wherein the charging station and the self-moving device wirelessly communicate with each other, and if the charging station detects that the boundary wire is in a disconnected state, the charging station sends disconnection information representing that the boundary wire is in a disconnected state to the self-moving device.

13. The automatic working system of claim 8, wherein the boundary wire signal has a signal transmission range, and a range of a working region defined by the boundary wire is larger than the signal transmission range of the boundary wire signal.

14. An automatic working method of a self-moving device, wherein the automatic working method comprises a method for automatically identifying whether a self-moving device is within a boundary wire, wherein the method comprises the following steps:
step 1: providing a self-moving device moving in a working region defined by a boundary wire, wherein boundary wire signals exist around the boundary wire;
step 2: detecting the boundary wire signal to obtain a detection result whether the boundary wire signal can be detected;
step 3: selecting, according to the detection result, a method for determining whether the self-moving device is within the boundary wire, which is specifically that: if the detection result is that the boundary wire signal cannot be detected, perform step 4; and if the detection result is that the boundary wire signal can be detected, perform step 5;
step 4: inputting the location coordinates of the self-moving device into the program module, to obtain whether the self-moving device is within the boundary wire; and
step 5: inputting the boundary wire signal obtained by the signal detector into the program module, to obtain whether the self-moving device is within the boundary wire.

15. The automatic working method of claim 14, wherein in step 1, the self-moving device moves around the boundary wire by one circle to record location coordinates of the boundary wire.

16. The automatic working method of claim 14, wherein the location coordinates have a positioning precision, the boundary wire signal has a signal transmission distance, and the positioning precision is not less than the signal transmission distance of the boundary wire signal.

17. The automatic working method of claim 14, wherein in step 1, the location coordinates of the self-moving device are obtained via satellite positioning using a satellite positioning system.

18. The automatic working method of claim 14, wherein in step 1, when the self-moving device detects the boundary wire signal, the self-moving device is in the boundary wire signal covered region, and when the self-moving device does not detect the boundary wire signal, the self-moving device is in the boundary wire signal uncovered region.

19. The automatic working method of claim 14, wherein the automatic working method further comprises the following steps:
step 6: providing a charging station configured to detect whether the boundary wire is disconnected, if it is detected that the boundary wire is disconnected, perform step 7, and if it is not detected that the boundary wire is disconnected, continue step 6; and step 7: controlling the self-moving device to stop or controlling the self-moving device to work in the boundary wire signal uncovered region by the control module.

20. The automatic working method of claim 19, wherein in step 6, the charging station and the self-moving device wirelessly communicate with each other, and if the charging station detects that the boundary wire is in a disconnected state, the charging station sends disconnection information representing that the boundary wire is in a disconnected state to the self-moving device.

* * * * *